(12) United States Patent
Rooney et al.

(10) Patent No.: US 10,406,720 B2
(45) Date of Patent: Sep. 10, 2019

(54) APPARATUS AND METHOD FOR SEPARATING FIBERS IN WOOD LOGS

(71) Applicant: SCRIMTEC HOLDINGS, LLC, Shuqualak, MS (US)

(72) Inventors: Kevin Patrick Rooney, Lauderdale, MS (US); William Anderson Thomas, Jr., Macon, MS (US); James Michael White, Arkadelphia, AR (US); Roy Daniel Seale, Starkville, MS (US); Bobby Lyn White, Meridian, MS (US); Adam Glenn Barwick, Laurel, MS (US); Don Roberts Clark, Witts Springs, AR (US)

(73) Assignee: SCRIMTEC HOLDINGS, LLC, Shuqualak, MS (US)

( * ) Notice: Subject to any disclaimer, the term of this patent is extended or adjusted under 35 U.S.C. 154(b) by 561 days.

(21) Appl. No.: 14/628,412

(22) Filed: Feb. 23, 2015

(65) Prior Publication Data
US 2016/0243720 A1 Aug. 25, 2016

(51) Int. Cl.
  B27L 11/08 (2006.01)
  B27L 11/02 (2006.01)
  B27L 1/10 (2006.01)

(52) U.S. Cl.
  CPC .............. B27L 11/08 (2013.01); B27L 1/10 (2013.01); B27L 11/02 (2013.01)

(58) Field of Classification Search
  CPC .................................... B27L 1/08; B27L 1/10

USPC .............. 144/237, 208.1, 208.3, 208.4, 246
See application file for complete search history.

(56) References Cited

U.S. PATENT DOCUMENTS

| | | | |
|---|---|---|---|
| 1,691,897 A | 11/1928 | Breidenbach | |
| 1,699,582 A | 1/1929 | Breidenbach | |
| 2,193,864 A | 3/1940 | Fidler et al. | |
| 2,338,136 A | 1/1944 | Shaw et al. | |
| 2,490,165 A * | 12/1949 | Shaw | B23Q 7/05 |
| | | | 144/208.3 |
| 2,528,300 A | 10/1950 | Degner | |
| 2,588,903 A * | 3/1952 | Akins | B27L 1/10 |
| | | | 142/32 |
| 2,641,289 A * | 6/1953 | Merrifield | B23Q 7/03 |
| | | | 144/208.4 |

(Continued)

OTHER PUBLICATIONS

International Search Report and Written Opinion for International Patent Application No. PCT/US2016/019181; dated Apr. 13, 2016.

(Continued)

*Primary Examiner* — Shelley M Self
*Assistant Examiner* — Smith Oberto Bapthelus
(74) *Attorney, Agent, or Firm* — Barnes & Thornburg LLP; Jason Bernstein

(57) ABSTRACT

An apparatus for pre-processing logs to separate outer jacket fibers, comprising a plurality of spaced apart rollers through which a log can pass, each roller having at least one outwardly extending concentric projection, the projection being suitable to separate fibers. A pressure mechanism determines the diameter of the log so that the rollers can provide the appropriate amount of pressure to and engagement of the projections with the log. A feeding mechanism moves the log along a flow path past the rollers.

23 Claims, 6 Drawing Sheets

(56) References Cited

U.S. PATENT DOCUMENTS

| | | | | |
|---|---|---|---|---|
| 2,725,908 A * | 12/1955 | Ednell | | B27L 1/08 |
| | | | | 144/208.8 |
| 2,785,715 A * | 3/1957 | Brundell | | B27L 1/045 |
| | | | | 144/208.8 |
| 2,857,945 A * | 10/1958 | Brundell | | B27L 1/04 |
| | | | | 144/208.8 |
| 2,860,672 A * | 11/1958 | Brundell | | B27L 1/045 |
| | | | | 144/208.8 |
| 2,903,028 A * | 9/1959 | Brundell | | B27L 1/04 |
| | | | | 144/208.8 |
| 3,028,891 A * | 4/1962 | Dillingham | | B27L 1/10 |
| | | | | 144/208.6 |
| 3,255,070 A * | 6/1966 | Bersano | | B27L 11/06 |
| | | | | 144/208.4 |
| 3,360,024 A | 12/1967 | Traben | | |
| 3,490,665 A * | 1/1970 | Jonsson | | B27B 25/02 |
| | | | | 144/208.8 |
| 3,610,079 A | 10/1971 | Ashby | | |
| 3,638,868 A * | 2/1972 | Bersano | | D21B 1/063 |
| | | | | 162/26 |
| 3,700,182 A | 10/1972 | Dediemar et al. | | |
| 3,774,660 A * | 11/1973 | Morey | | B27L 1/10 |
| | | | | 144/208.4 |
| 3,913,644 A * | 10/1975 | Braun | | B27L 1/04 |
| | | | | 144/208.1 |
| 4,425,952 A * | 1/1984 | Pousette | | B27L 1/045 |
| | | | | 144/248.5 |
| 4,522,242 A * | 6/1985 | Hutson | | B27L 1/04 |
| | | | | 137/346 |
| 4,711,684 A | 12/1987 | Coleman | | |
| 4,875,511 A * | 10/1989 | Wingate-Hill | | B27L 1/00 |
| | | | | 144/208.1 |
| 5,070,920 A * | 12/1991 | Morey | | B27G 13/10 |
| | | | | 144/208.4 |
| 5,279,691 A | 1/1994 | Stickland | | |
| 5,383,504 A | 1/1995 | Cremona | | |
| 6,276,412 B1 * | 8/2001 | Johnston | | B27G 13/005 |
| | | | | 144/2.1 |
| 6,923,227 B2 * | 8/2005 | Robitaille | | B27L 11/005 |
| | | | | 144/176 |
| 8,776,681 B2 | 7/2014 | White et al. | | |
| 2003/0226617 A1 * | 12/2003 | Choquette | | B27C 5/08 |
| | | | | 144/4 |
| 2006/0060290 A1 | 3/2006 | Jarck | | |
| 2007/0122644 A1 | 5/2007 | Jarck | | |
| 2016/0243720 A1 * | 8/2016 | Rooney | | B27L 11/08 |

OTHER PUBLICATIONS

International Preliminary Report on Patentability for International Patent Application No. PCT/US2016/019181; dated Sep. 8, 2017.

* cited by examiner

APPARATUS AND METHOD FOR SEPARATING FIBERS IN WOOD LOGS

FIELD

The present disclosure generally relates to apparatus used in forming engineered wood products. More particularly, exemplary embodiments of the present disclosure relate to an apparatus for separating fibers in natural wood logs prior to processing of the wood to form a fibrous mat.

BACKGROUND

Processing the trees into engineered products involves a number of steps. One of the steps is crushing young trees (stripped of branches) to obtain loose bundles of fibrous strands. The bundles of fibers are formed into mats of crushed fibers with the fibers being generally parallel. The mats may be dried. Resin may then be added as well as possibly other binding agents and the mat dried to eventually reach a target moisture content and density. After the fibers are formed into mats and before resin is added the mats must be processed to provide a uniform density of fibers across the mat.

The outer "jacket" of the log comprised of the wood fiber from the area just underneath the bark, is generally stronger, denser and more difficult to break down than the inner region. It would be desirable to break down or separate the fibers of the outer region first, prior to the log being crushed, so that a fiber bundle having a more uniform density can be obtained for downstream processing.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to the more detailed description below.

Generally described, the present disclosure provides in a first exemplary embodiment an apparatus for pre-processing logs to be used in forming a fibrous mat of crushed log fibers, the apparatus comprising (a) a fiber separator comprising a first station including a first roller and a second roller, the first roller and the second roller being separated by a first distance and being annularly positioned with respect to an axis of a flow path, the first and second rollers each including an outer circumference with one or more outwardly extending concentric projections, the projections suitable to separate fibers of a wood log; (b) a pressure mechanism, the pressure mechanism configured to determine the diameter of a wood log being processed and provide an appropriate amount of pressure to the first and second rollers corresponding to the determined diameter of the wood log to ensure the projections engage with and extend into the surface of an outer circumference of the wood log; and (c) a wood-feeding mechanism configured to move the wood log along the flow path through the fiber separator such that the projections engage with at least a portion of the outer circumference of the wood log and cause longitudinal separation of fibers in the wood log substantially without cutting or compressing the fibers.

Also provided in exemplary embodiments is a method of pre-processing wood logs to be used in forming a fibrous mat, the method comprising:

(a) removing wood fiber from the log;
(b) determining the diameter of the treated log of step (a);
(c) inserting the log longitudinally into a fiber separator, the fiber separator comprising one or more rollers annularly positioned with respect to an axis of a flow path for the log, the rollers each including an outer circumference with one or more outwardly extending projections;
(d) applying pressure to the one or more rollers such that the outwardly extending projections engage with an outer circumference of the log, the pressure being pre-determined based on the specific diameter of the log; and
(e) rolling the rollers in order to separate fibers of the log with the outwardly extending projections by movement of the log with respect to the rollers, the outwardly extending projections used to separate but not appreciably cut or compress the wood fibers.

Other features will become apparent upon reading the following detailed description of certain exemplary embodiments, when taken in conjunction with the appended claims.

BRIEF DESCRIPTION OF THE DRAWINGS

The drawings disclose exemplary embodiments in which like reference characters designate the same or similar parts throughout the figures of which.

DETAILED DESCRIPTION

Figure 1:
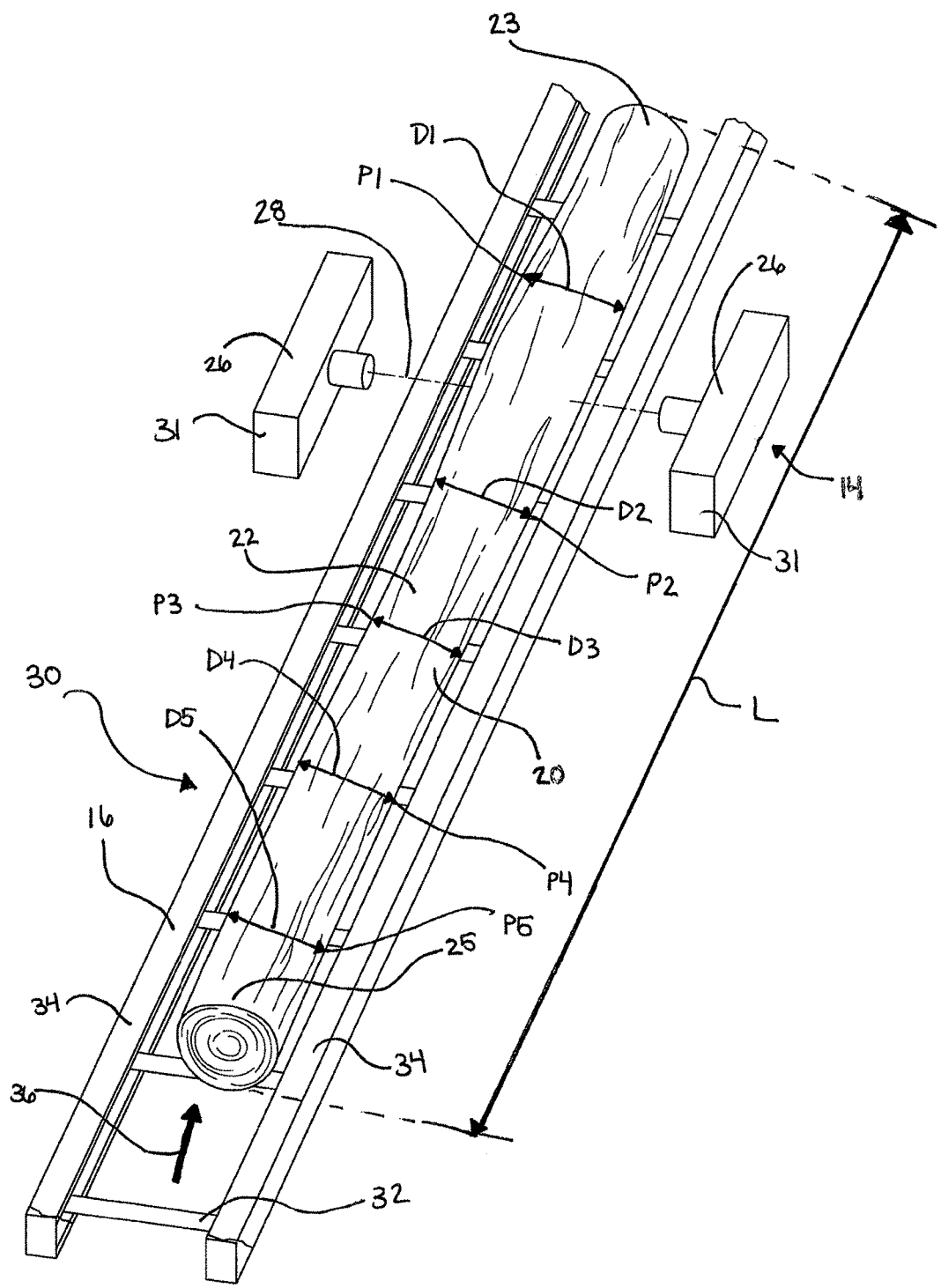
FIG. 1 is a side perspective view of a portion of a processing mechanism for timber logs in accordance with the present disclosure.

Steam press scrim lumber ("SPSL") is composed of processed mats of fibers obtained by crushing and processing logs of generally small diameters. Specifically, the logs are processed in such a manner and then crushed with the fibers separated into fiber pieces, called scrim, that are layered together to form a mat. In typical embodiments, lumber is harvested and may be processed prior to being crushed, the processing permitting removal of bark ("debarking") and effective crushing of the logs into the scrim pieces. Once crushed, the scrim fiber pieces are further processed and compressed together to form SPSL. Various processing conditions for creating SPSL are known in the industry, as disclosed, for example, in U.S. Pat. No. 8,776,681, the disclosure of which is incorporated herein by reference. A log typically has an outer layer or jacket of wood fibers, beneath which is the inner wood fibers. The outer jacket fibers are generally tougher than the inner wood fibers. In log processing, the bark is removed first; then, the outer jacket fibers and inner wood fibers are crushed and separated to permit formation of the mat. It would be advantageous to be able to separate the tougher outer jacket fibers prior to crushing the softer inner wood fibers so as to obtain a more uniform fiber density, which results in a mat with more even density and, hence, more uniform strength across the mat.

As illustrated in FIGS. 1-4, an improved mechanism for processing timber prior to crushing is provided that permits creation of more uniform and/or consistent scrim fiber. In particular, a processing apparatus 10 for processing timber logs 20 to be used in forming a fibrous mat of crushed log fibers includes a fiber separator 12, a pressure mechanism 14 configured to engage with the fiber separator 12, and a wood-feeding mechanism 16 configured to transport the timber 20 through the fiber separator 12. As described in detail below, the fiber separator 12 is configured to engage with an outside surface 22 of the timber 20 as it travels through the fiber separator 12 in such a manner that the outer jacket fibers in the outer surface 22 are separated from each other without appreciably cutting or compressing the fibers.

In illustrative embodiments, timber 20 is collected from harvested trees or wood and then is treated or processed to permit the timber 20 to effectively break down or splinter when crushed in order to create timber fibers. The timber 20 may be debarked by any traditional or known methods prior to processing (not shown). Once debarked, timber logs 20 may be conveyed to the fiber separator 12 in a singular fashion by conventional conveyance means 30. As illustrated for example in FIG. 1, this conveyance means 30 may include the wood-feeding mechanism 16. The wood-feeding mechanism 16 may include, for example, a conveyor belt 32 spaced between two guide tracks 34, the conveyor belt 32 carrying a single timber log 20 lengthwise along a conveyance path 36 to the processing apparatus 10 so that a first end 23 of the log 20 enters the fiber separator 12 prior to the rest of the log. In this manner, multiple logs 20 may be arranged end-to-end (i.e., a first end 23 of a log 20 adjacent a second end 25 of another log 20) on the conveyor belt 32 and fed one-at-a-time into the fiber separator 12 in a lengthwise manner. Other wood-feeding mechanisms 16 that permit end-to-end introduction of timber logs 20 into the fiber separator 12 are also envisioned.

In illustrative embodiments, prior to entry into the fiber separator 12, the diameter D of each timber log 20 may be determined by a portion of the pressure mechanism 14. In particular, the diameter D of the timber log 20 may be determined at various points along the length L of the timber log 20 by a diameter tracker 31. For instance, and as seen in FIG. 1, diameters D1, D2, D3, D4, and D5 may be determined at points P1, P2, P3, P4 and P5 on the timber log 20. Alternatively, the continuously changing diameter D of the timber log 20 may be determined along the entire length L of the timber log 20 to track and record the changes and fluctuations in the diameter D. Other means of determining the diameter D of a timber log 20 are also envisioned. In illustrative examples, the diameter tracker 31 may be used to electronically determine the diameter D of the timber log 20. The diameter tracker 31 may include a laser or scanning device 26 that comprises a beam 28 extending across the conveyance path 36, the beam 28 being interrupted when a timber log 20 passes along the path 36 to permit the scanning device 26 to accurately determined the diameter of the timber 20. The diameter tracker 31 may be in direct or indirect electronic communication with other portions of the pressure mechanism 14, as more fully described below. Other means of measuring and tracking the diameter D of the timber log 20 known to those skilled in the art are also envisioned.

Figure 2:
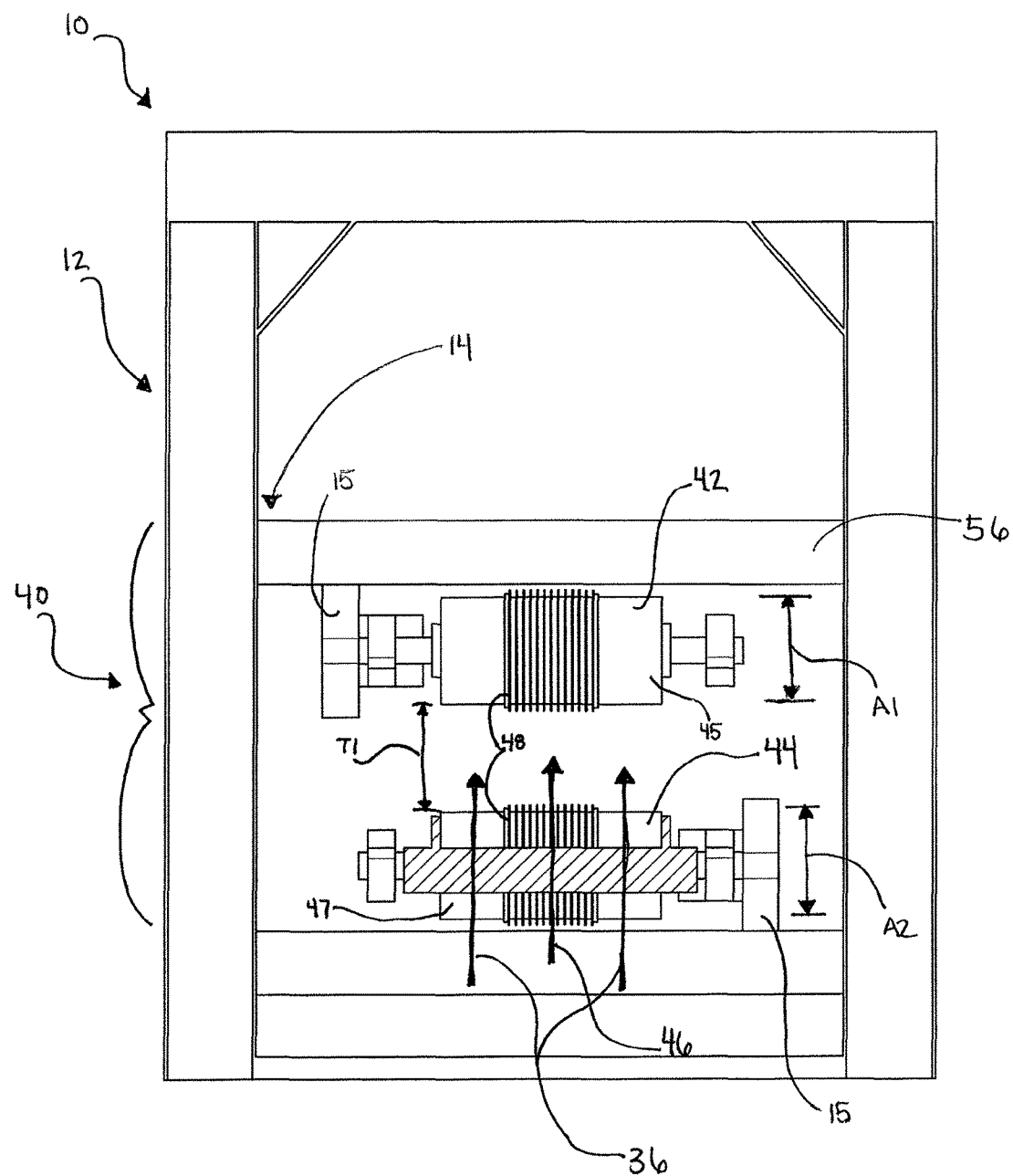
FIG. 2 is a front perspective view of a fiber separator of the processing mechanism of FIG. 1 according to one exemplary embodiment.
Figure 3:
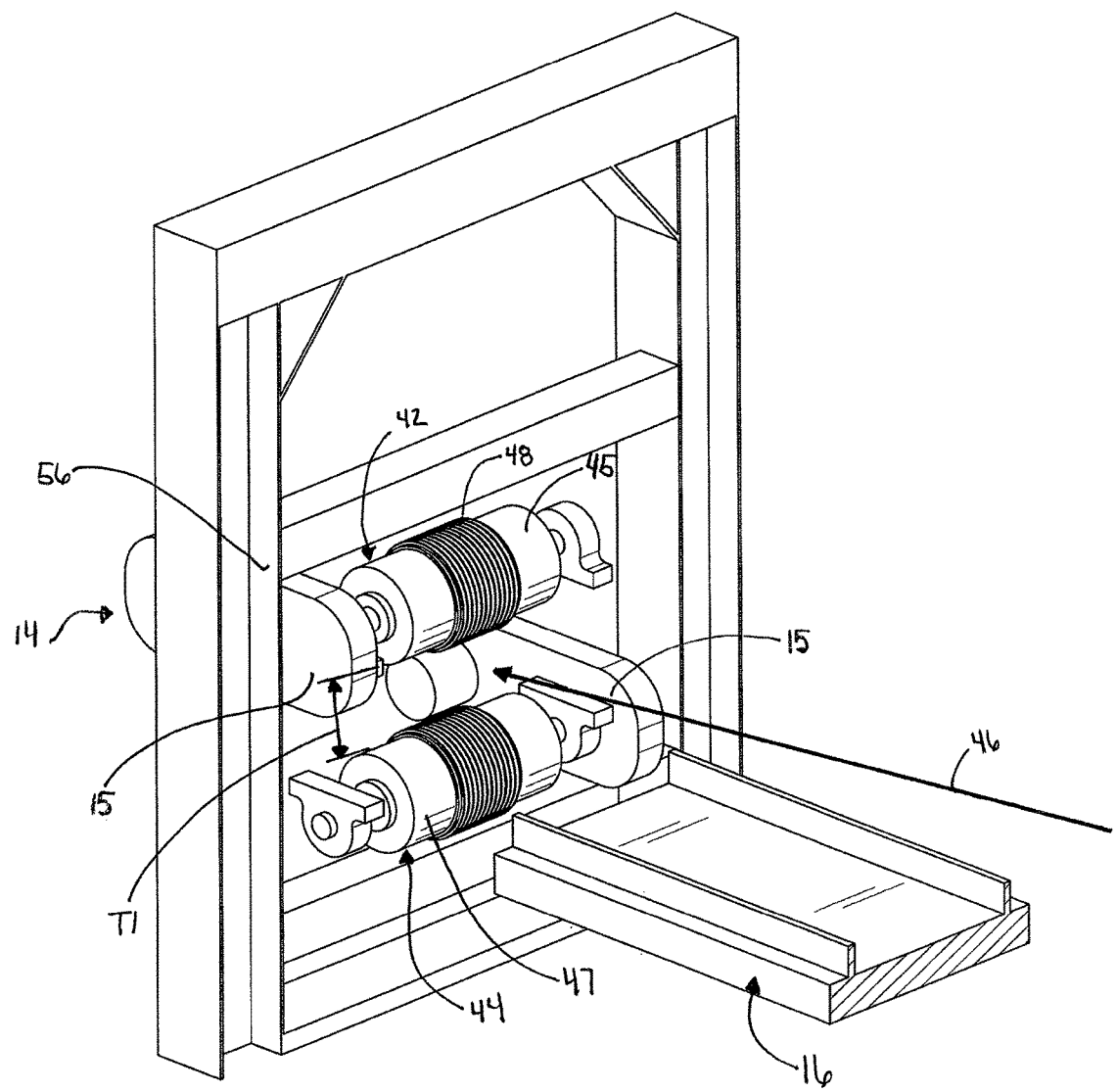
FIG. 3 is a side perspective view of the apparatus of FIG. 2.

In illustrative embodiments, the timber 20 is configured to enter the fiber separator 12 from the conveying means 30. In particular, the first end 23 of the timber log 20 may be configured to be fed into the fiber separator 12 of the processing apparatus 10, as illustrated in FIG. 2. The fiber separator 12 includes a first station 40, the first station 40 including, for example, a number of rollers 41, such as, a first roller 42 and a second roller 44. Both the first roller 42 and the second roller 44 may be annularly positioned with respect to the conveyance path 36. The second roller 44 may be spaced apart from the first roller 42 by a first distance T1. As illustrated in FIG. 2, the first roller 42 and second roller 44 may be positioned annularly opposite of each other with respect to (i.e., with each roller axis of rotation being generally perpendicular to) a flow path 46 that aligns with the conveyance path 36 of the timber logs 20, and more particularly may be positioned, for example, above and below the flow path 46. The first and second rollers 42 and 44 are configured to engage with the surface 22 of the timber log 20 as it travels along the flow path 46, and both rollers 42 and 44 may rotate with respect thereto. In particular, the first distance T1 between the first roller 42 and the second roller 44 may be determined to correlate or be proportionate to the diameter D of a timber log 20 as it is processed through the fiber separator 12. In exemplary embodiments, the axis of the rollers 42, 44 may be at an angle with respect to the flow path 46 direction.

Figure 4A:
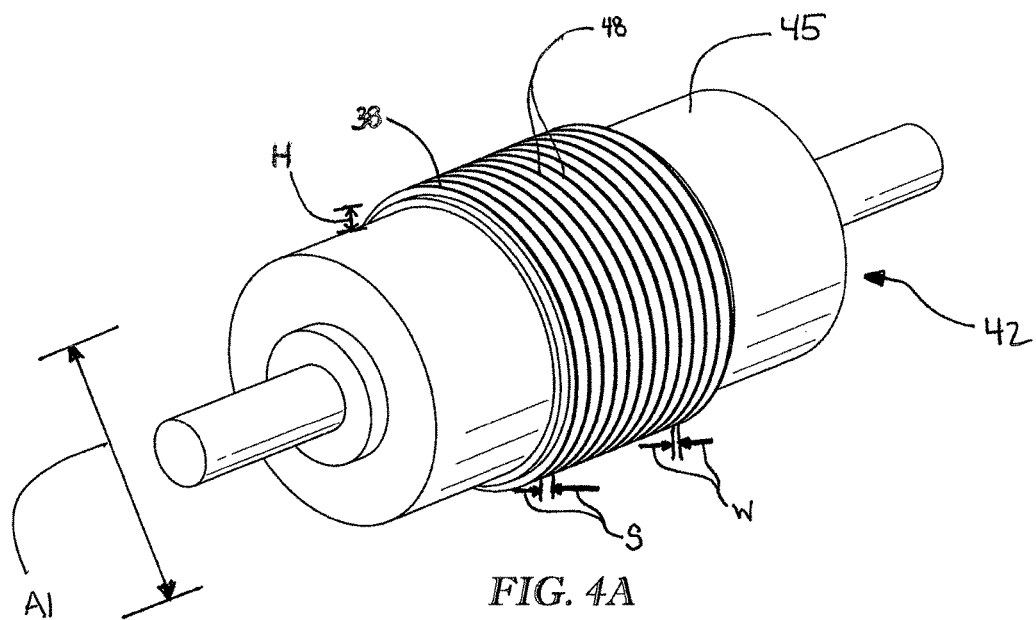
FIG. 4A is a side perspective view of an exemplary embodiment of a roller of the fiber separator of FIG. 2.

In illustrative embodiments, the first and second rollers 42 and 44 include outer circumferential surfaces 45 and 47, respectively, that include one or more concentric projections 48 extending outwardly therefrom, as illustrated in FIG. 4A. The projections 48 are suitable for separating fibers of the timber log 20 when pressed against the outer surface 22 of the timber log 20. Specifically, and in illustrative embodiments, the projections 48 may be screw-thread-like flights that are continuous around the outer surfaces 45 or 47. The projections 48 may be concentric in nature. In illustrative embodiments, a length or height H between an end point 38 of the projections 48 and the outer surfaces 45 or 47 may be about 1 inch. In illustrative embodiments, the projections 48 may have a thickness W of about 1/16 inch. In illustrative embodiments, a distance S between projections may be about 3/8 inch. Other various distances are also envisioned to optimize the spacing so as to permit the projections to separate the outer jacket fibers in the timber log 20 when the projections 48 engage therewith without appreciably cutting or compressing the fibers.

The first and second rollers 42 and 44 may be variously configured. In exemplary embodiments, one or both of the rollers 42, 44 may have a surface that is generally flat, or, the surface may be curved, convex, concave or other shape.

Figure 4B:
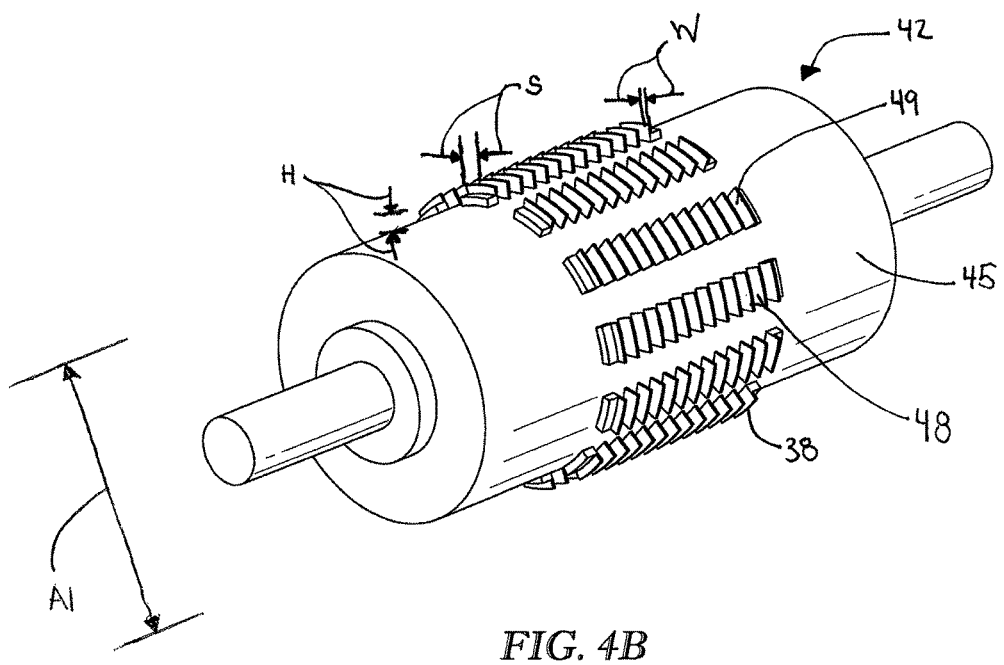
FIG. 4B is a side perspective view of another exemplary embodiment of a roller of the fiber separator of FIG. 2.

The projections 48 of the rollers 42 and 44 may be configured of various shapes and sizes. As illustrated in FIG. 4A, the projections 48 may be shaped as continuous blades that extend at least partially around the circumference of the rollers 42 and 44. In other embodiments, one or more singular teeth 49 may extend away from the circumferential surfaces 45 and 47 of the first and second rollers 42 and 44, as shown in FIG. 4B. Other shapes and sizes of projections are also envisioned to permit separation of the outer jacket fibers in a timber log 20.

In exemplary embodiments, the projections 48 may be arranged in rows, offset, in echelons, random, or in other regular or irregular spacings. In exemplary embodiments, several different types, lengths, widths, configurations, and spacings of projections 48 can be used in a single roller. The projections 48 may have a length that is aligned with the flow path 46, or may be at angle to or perpendicular to the flow path 46.

In illustrative embodiments, the first and second rollers 42 and 44 may have diameter A1 and A2, respectively. Diameter A1 may be the same size or larger or smaller than diameter A2, depending on the timber logs 20 being processed and the desired amount of fiber separation sought.

Figure 5:
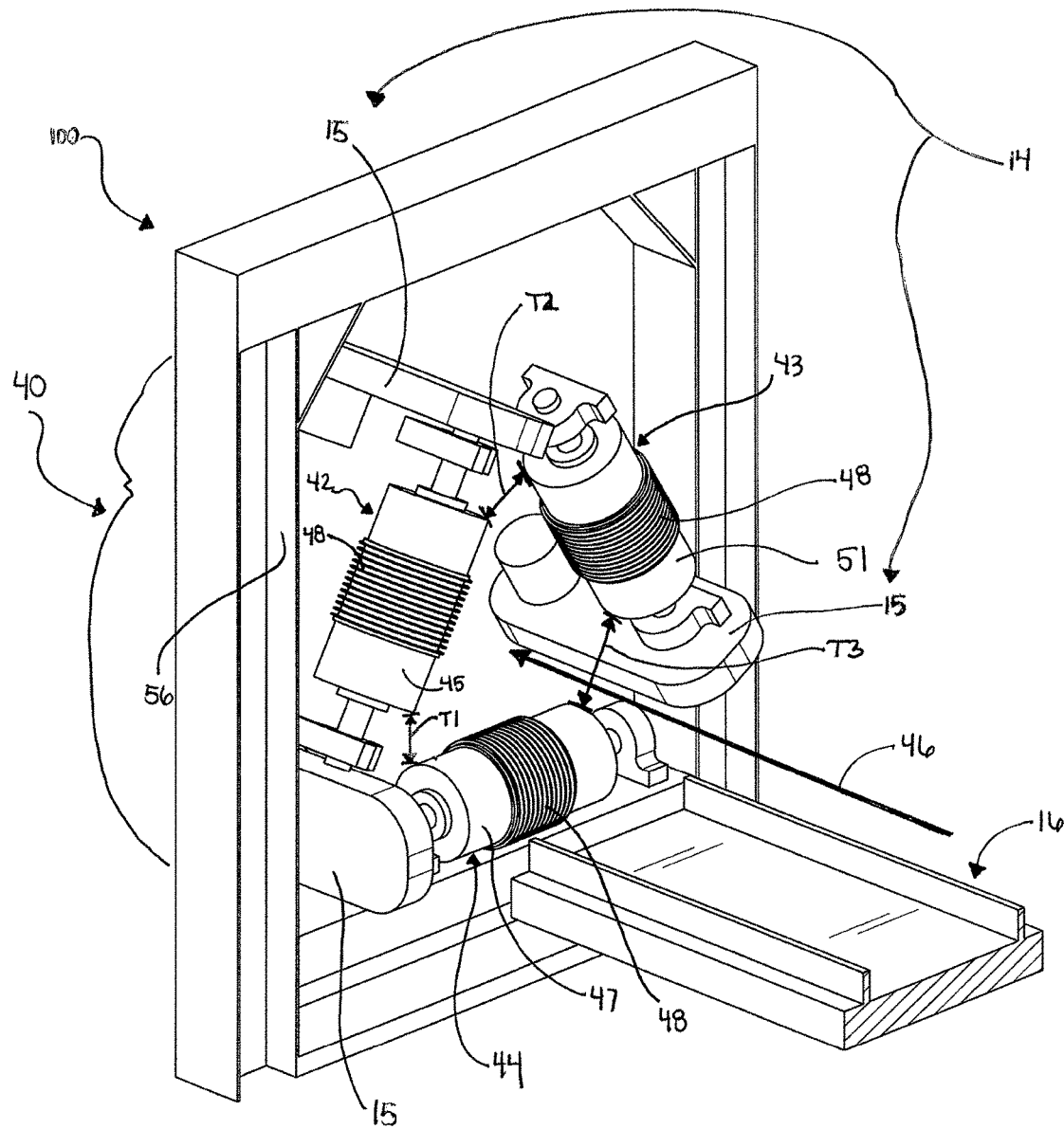
FIG. 5 is a front perspective view of an alternative embodiment of the fiber separator of the present disclosure having three roller units.

In other exemplary embodiments, and as exemplified in FIG. 5, the first station 40 of a fiber separator 100 may include a third roller 43 that is annularly positioned with respect to the flow path 46. As with the first and second rollers 42 and 44, the third roller 43 may also include an outer circumferential surface 51 that includes one or more outwardly extending concentric projections 48 extending outwardly therefrom (as described hereinabove). The third roller 43 may be spaced apart from the first roller 42 by a second distance T2, and the third roller 43 may be spaced apart from the second roller 44 by a third distance T3. The first, second and third rollers 42, 43, and 44 may be annularly positioned with respect to the conveyance path 36 such that the first, second, and third distances T1, T2 and T3 are equal in length. In illustrative embodiments, the first, second and third rollers 42, 43, and 44 may be positioned around the conveyance path 36 similar to locations on a clock-face, with the first roller 42 being positioned in the 2 o'clock position, the second roller 44 being positioned in the 6 o'clock position, and the third roller 43 being positioned in the 10 o'clock position (i.e., offset at 120 degrees from each other), as illustrated in FIG. 5. Other placement angles or positions are also envisioned.

Figure 6:
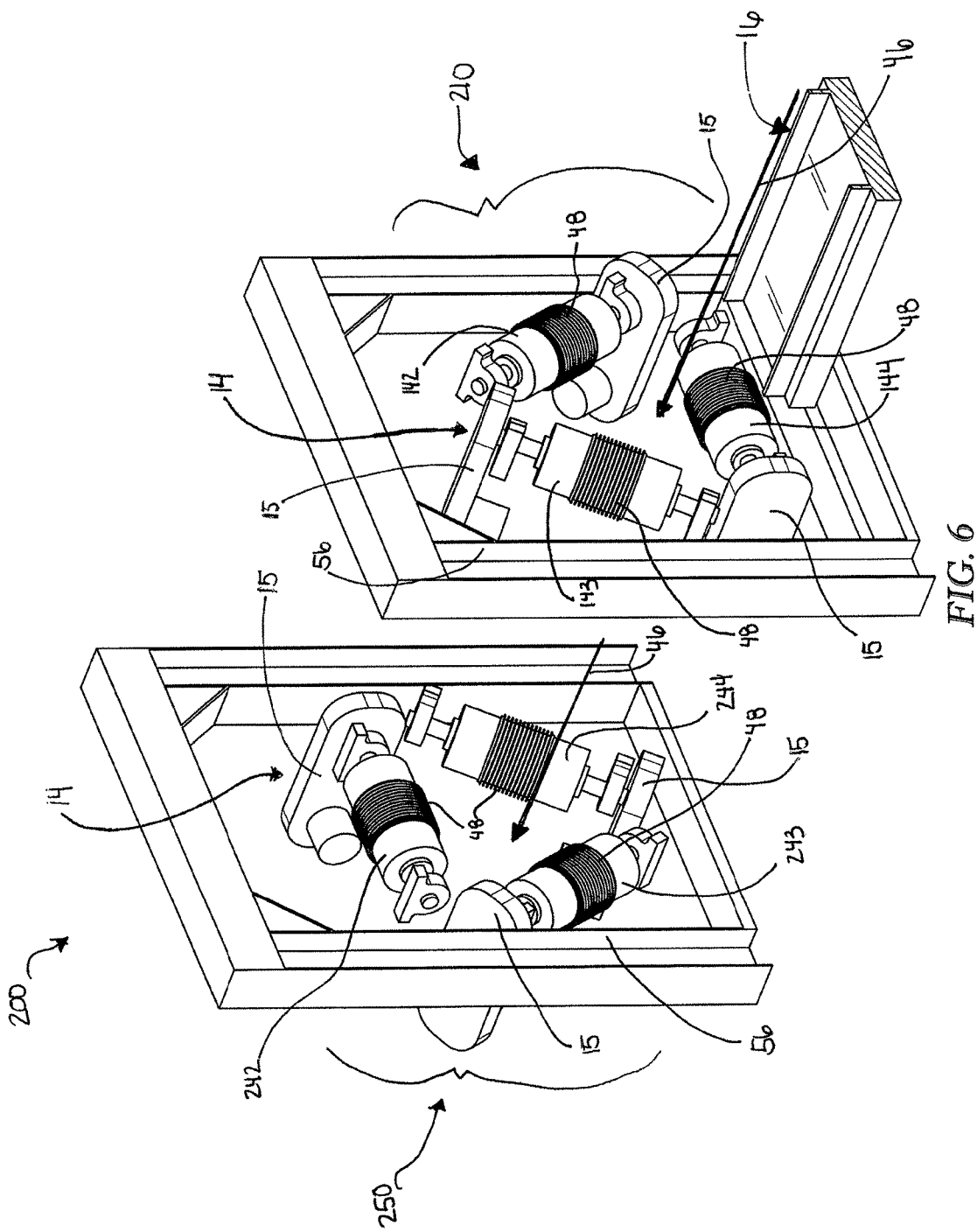
FIG. 6 is a front perspective view of an alternative embodiment of the fiber separator of the present disclosure having two sets of three roller units.

In another exemplary embodiment, as illustrated in FIG. 6, a fiber separator 200 may have a first station 210 having a set of three rollers 41, namely, rollers 142, 143, and 144, similar in arrangement to the arrangement described hereinabove for fiber separator 100, wherein the rollers are arranged at roughly 120 degrees apart from each other, for example, at the 2, 6 and 10 o'clock positions. In addition a second station 250 is included. Second station 250 has a set of three rollers, namely, rollers 242, 243, and 244 positioned at 12, 4 and 8 o'clock positions. A log 20 first passes through the first station 210 and the exterior is contacted by the rollers 142, 143, and 144. The log 20 (or at least a portion thereof) exits the first station 210 and enters the second station 250 and is contacted by the second station rollers 242, 243, and 244. In this manner, a greater percentage of the log 20 exterior is contacted by the rollers, i.e., contact is at 12, 2, 4, 6, 8, and 10 o'clock positions. Other placement positions for the rollers of the second station 50 are also envisioned. Further, additional stations may exist along the flow path 46 to further process a timber log 20. In exemplary embodiments, a fiber separator apparatus 10 may have three, or more, fiber separators 12, each having two or more rollers.

In exemplary embodiments, each roller may have a set of projections 48 that are the same, or, one or more of the rollers may have projections 48 that are different than those of the other rollers.

As a timber log 20 is introduced into the fiber separator 12, the first and second rollers 42 and 44 will be spaced apart distance T1 to permit the projections 48 to engage in the surface 22 of the timber log 20 to separate the outer jacket fibers within the surface 22 without appreciably cutting or compressing the fibers, "appreciably" meaning not sufficient cutting or compressing to materially affect the average fiber length of the fibers in the mat. Because of the design of the projections 48, the projections 48 are able to be inserted between the outer jacket fibers and force or urge adjacent fibers or fiber bundles apart from each other.

The pressure mechanism 14 of the processing apparatus 10 is configured to determine the diameter D of the timber log 20 being processed (as described above) and provide an appropriate gap or space (which may be used to determine the distance T1) between the first and/or second rollers 42 and 44, and an appropriate amount of pressure exerted on the log 20 from the first and/or second rollers 42 and 44, based on the diameter D of the timber log 20 being processed in order to achieve a desired result. For example, the diameter information of the timber log 20 as collected from the diameter tracker 31 may be input into a computing device (not shown) which generates continuous set points for the rollers 42 and 44 for each corresponding diameter point, e.g., D1, D2, D3, etc., along the timber log 20. Using conventional actuation means known in the industry, the pressure mechanism 14 may include a pressure regulator 15, such as, but not limited to, a hydraulic piston, that may be included in the fiber separator 12, and more particularly may be coupled to the first and/or second rollers 42 and 44, to cause one or more of the rollers 42 and 44 to bear down or move toward/away from the log 20 travelling along the flow path 46. In such a manner, the pressure regulator 15 ensures the projections 48 engage with and extend into the surface 22 of the timber log 20 in order to adequately separate the outer jacket fibers. By tracking the continuous changes of the diameter D of the log 20 along the length of the log 20, the pressure regulator 15 can be configured to change the distance T1 between the rollers 42 and 44 continuously to correspond to the changes in the diameter D of the log 20 as it travels through the fiber separator 12.

In illustrative embodiments, the pressure regulator 15 may be configured to move the first roller 42 relative to the second roller 44, or vice versa, or may be configured to move both the first and second rollers 42 and 44 together, in order to change the distance T1 between the rollers 42 and 44. In other embodiments, the pressure mechanism 14 may be configured to move an entire frame member 56 that the first and/or second rollers 42 and 44 are fixedly coupled to. Other means of adjusting the first and second rollers 42 and 44 relative to each other based on the pressure mechanism 14 are known in the industry. Similar mechanisms can be used to adjust the distances between the three rollers as shown in FIG. 7.

Cutting of the outer jacket fibers can reduce average fiber length, which can negatively affect strength properties of the mat and finished product formed from the fibers. Also, it is desirable to avoid crushing the outer jacket fibers because the finished product properties could be affected negatively because the process can "overdo" the separation and cause degradation of the fiber quality. A feature of the presently disclosed apparatus 10 is that the unique design and arrangement of the projections 48 minimize or avoid cutting or crushing of the outer jacket fibers.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. It is intended that the specification and examples be considered as exemplary only, with a true scope and spirit being indicated by the following inventive concepts.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

The headings of various sections are used for convenience only and are not intended to limit the scope of the present disclosure.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods, equipment and systems. These and other components are disclosed herein, and it is understood that when combinations, subsets, interactions, groups, etc., of these components are disclosed that while specific reference of each various individual and collective combinations and permutation of these may not be explicitly disclosed, each is specifically contemplated and described herein, for all methods, equipment and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

It should further be noted that any patents, applications and publications referred to herein are incorporated by reference in their entirety.

The invention claimed is:

1. An apparatus for pre-processing a debarked wood log having an inner region and an outer jacket arranged around the inner region, the outer jacket having a higher fiber density than the inner region, the debarked wood log to be used in forming a fibrous mat of crushed log fibers, the apparatus comprising:
   a. a fiber separator comprising a first roller and a second roller, the first roller and the second roller being separated by a first distance and being annularly positioned with respect to an axis of a log flow path, the first and second rollers each including an outer circumference with one or more outwardly extending concentric projections, the one or more outwardly extending concentric projections suitable to separate fibers of the debarked wood log, the first roller and second roller each arranged for ration about roller axes substantially perpendicular to the axis of the log flow path;
   b. a pressure regulating mechanism comprising a first piston coupled to the first roller, a second piston coupled to the second roller, and a sensor, the sensor configured to determine a diameter of the debarked wood log being processed and the first and second pistons configured provide an appropriate amount of pressure of the first and second rollers against the debarked wood log corresponding to the determined diameter of the debarked wood log so as to ensure the one or more outwardly extending concentric projections engage with and extend into the outer jacket of the debarked wood log; and,
   c. a conveyor mechanism configured to move the debarked wood log along the log flow path through the fiber separator, wherein the pressure regulating mechanism is configured to bias the first and second rollers toward the debarked wood log such that the one or more outwardly extending concentric projections extend into at least a portion of the outer jacket of the debarked wood log to cause longitudinal separation of adjacent fibers in the outer jacket of the debarked wood log apart from one another substantially without cutting or compressing the fibers and to a degree such that the engaged portions of the outer jacket have a substantially similar fiber density as the inner region of the debarked wood log.

2. The apparatus of claim 1, wherein the one or more outwardly extending concentric projections define one or more substantially continuous flights extending around the outer circumference of the respective first and second rollers.

3. The apparatus of claim 2, wherein at least one of the flights defines a substantially continuous ring around the outer circumference.

4. The apparatus of claim 2, wherein an end point of at least one of the flights extends away from the outer circumference by at least 1 inch.

5. The apparatus of claim 4, wherein the at least flight has a thickness of about 1/16 inch.

6. The apparatus of claim 5, wherein the at least one flight includes two flights, and wherein the two flights are separated by a distance of about 3/8 inch along the roller axis.

7. The apparatus of claim 1, wherein at least one of the outwardly extending concentric projections is at least one spiral thread.

8. The apparatus of claim 1, wherein the pressure regulating mechanism includes a pressure regulator that is hydraulically operated.

9. The apparatus of claim 1, wherein the pressure regulating mechanism detects changes in the diameter of the debarked wood log as the debarked wood log travels along the log flow path.

10. The apparatus of claim 1, wherein the fiber separator further includes a third roller being annularly positioned with respect to the log flow path, the third roller including an outer circumference with one or more outwardly extending concentric projections that are suitable to separate fibers of the outer jacket of the debarked wood log.

11. The apparatus of claim 10, wherein the first, second and third rollers are positioned equidistant from each other about the axis of the log flow path.

12. The apparatus of claim 1, wherein the first and second rollers are part of a first station of the fiber separator, and wherein the fiber separator further comprises a second station along a second flow path.

13. The apparatus of claim 12, wherein the second station includes a fourth roller, a fifth roller, and a sixth roller, the fourth roller, the fifth roller, and the sixth roller being annularly positioned with respect to an axis of the second flow path, the fourth, fifth and sixth rollers each including an outer circumference with one or more outwardly extending concentric projections suitable to separate fibers of the outer jacket of the debarked wood log.

14. The apparatus of claim 13, wherein the first station further includes a third roller being annularly positioned with respect to the log flow path, the third roller including an outer circumference with one or more outwardly extending concentric projections that are suitable to separate fibers of the outer jacket of the debarked wood log.

15. The apparatus of claim 14, wherein the outwardly extending concentric projections are spiral threads.

16. The apparatus of claim 14, wherein the debarked wood log is processed through the log flow path of the first station before being processed through the second flow path of the second station.

17. The apparatus of claim 16, wherein the first, second, and third rollers are positioned equidistant from each other about the axis of the log flow path, and wherein the fourth, fifth, and sixth rollers are positioned equidistant from each other about the axis of the second flow path.

18. The apparatus of claim 17, wherein the log flow path and the second flow path are substantially aligned, but the first, second and third rollers are offset from the fourth, fifth, and sixth rollers, respectively, about the axes of the flow paths.

19. The apparatus of claim 1, wherein the projections comprise a plurality of flights, each flight having a first width at a zero degree first position on a roller circumference and increasing in width to a second width at a second position on the roller circumference.

20. The apparatus of claim 1, wherein the projections comprise a plurality of projections, a first projection J1 having a first width JW1 at a zero degree first position on a roller circumference and other projections J2, J3, . . . Jn each having a width JWn+1 such that for projections spaced around the roller circumference, the value of "n" increases by a predetermined amount.

21. The apparatus of claim 1, wherein the one or more outwardly extending concentric projections of the first and second rollers are configured to separate the fibers of the outer jacket substantially without removing the fibers from the inner region.

22. An apparatus for pre-processing a debarked wood log having an inner region and an outer jacket arranged around the inner region, the outer jacket having a higher fiber density than the inner region, the debarked wood log to be used in forming a fibrous mat of crushed log fibers, the apparatus comprising:
   a. fiber separating means including one or more projections configured for separating adjacent fibers in the outer jacket of the debarked wood log apart from one another without appreciably cutting through a width of or compressing the fibers and to a degree such that the engaged portions of the outer jacket have a substantially similar fiber density as the inner region of the debarked wood log;
   b. diameter determination means for determining a diameter of the debarked wood log being processed and for providing an appropriate amount of pressure to force the one or more projections into the outer jacket of the debarked wood log based on the determined diameter; and,
   c. feeding means for moving the debarked wood log along a log flow path along the fiber separating means.

23. A method of pre-processing a wood log having an inner region, an outer jacket arranged around the inner region, and a bark layer arranged around the outer jacket, the outer jacket having a higher fiber density than the inner region, the debarked wood log to be used in forming a fibrous mat, the method comprising:
   a. removing the bark layer from the wood log to form a debarked wood log having the outer jacket and inner region;
   b. determining a diameter of the debarked wood log;
   c. inserting the debarked wood log longitudinally into a fiber separator, the fiber separator comprising one or more rollers annularly positioned with respect to an axis of a log flow path through the fiber separator, the one or more rollers each including an outer circumference with one or more outwardly extending projections;
   d. applying pressure to the one or more rollers against the debarked log such that the outwardly extending projections extend into the outer jacket of the debarked wood log to separate adjacent fibers in the outer jacket of the debarked wood log apart from one another without appreciably cutting through the width of or compressing the fibers and to a degree such that the engaged portions of the outer jacket have a substantially similar fiber density as the inner region of the debarked wood log, the pressure being pre-determined based on the determined diameter of the debarked wood log; and
   e. rolling the rollers in order to separate the fibers in the outer jacket of the debarked wood log with the outwardly extending projections along a length of the debarked wood log by movement of the debarked wood log with respect to the rollers along the axis of the log flow path.

* * * * *